United States Patent [19]
Marangi

[11] Patent Number: 5,623,886
[45] Date of Patent: Apr. 29, 1997

[54] APPARATUS AND METHOD FOR INJECTING PREHYDRATED HYDROPHILIC POLYMER MATERIAL INTO THE GROUND

[76] Inventor: Rudy Marangi, P.O. Box 159, Rancho Cordova, Calif. 95741-0159

[21] Appl. No.: 588,520

[22] Filed: Jan. 18, 1996

[51] Int. Cl.$^6$ .................................................. A01C 15/00
[52] U.S. Cl. ........................ 111/200; 47/9; 111/127
[58] Field of Search .................... 47/9; 71/69, DIG. 1, 71/903; 111/200, 900, 174, 917, 118, 76, 127, 129

[56] References Cited

U.S. PATENT DOCUMENTS

| | | |
|---|---|---|
| 2,930,334 | 3/1960 | Marron et al. . |
| 3,330,070 | 7/1967 | Ferm et al. . |
| 3,331,340 | 7/1967 | Tschudy, Jr. . |
| 3,875,876 | 4/1975 | Pustovoit et al. . |
| 4,009,666 | 3/1977 | Russell et al. . |
| 4,034,686 | 7/1977 | Collins . |
| 4,807,544 | 2/1989 | Cross et al. . |
| 4,903,618 | 2/1990 | Blair . |
| 4,907,516 | 3/1990 | Rogers . |
| 5,101,745 | 4/1992 | Podevels et al. . |
| 5,119,744 | 6/1992 | Comer ........................ 111/127 |
| 5,291,842 | 3/1994 | Sallstrom et al. . |
| 5,303,663 | 4/1994 | Salestrom . |
| 5,322,418 | 6/1994 | Comer ..................... 111/127 X |
| 5,361,711 | 11/1994 | Beyerl ........................ 111/127 |
| 5,370,069 | 12/1994 | Monroe . |
| 5,394,812 | 3/1995 | Dunning et al. . |

Primary Examiner—Terry Lee Melius
Assistant Examiner—Robert Pezzuto
Attorney, Agent, or Firm—Thomas R. Lampe

[57] ABSTRACT

A system for injecting prehydrated hydrophilic polymer material into the ground includes a plurality of outlet nozzles which receive prehydrated hydrophilic polymer material from a supply tank and inject the material into the ground. Airless fluid ejector guns are connected to the outlet nozzles and control the flow of material through the nozzles. The prehydrated hydrophilic polymer material is pressurized by a powered piston pump and then delivered to the airless guns. The airless guns are actuated in a sequence which establishes a flow of pressurized prehydrated hydrophilic polymer material through some of the outlet nozzles while terminating flow of pressurized prehydrated hydrophilic polymer material through other of the outlet nozzles.

20 Claims, 7 Drawing Sheets

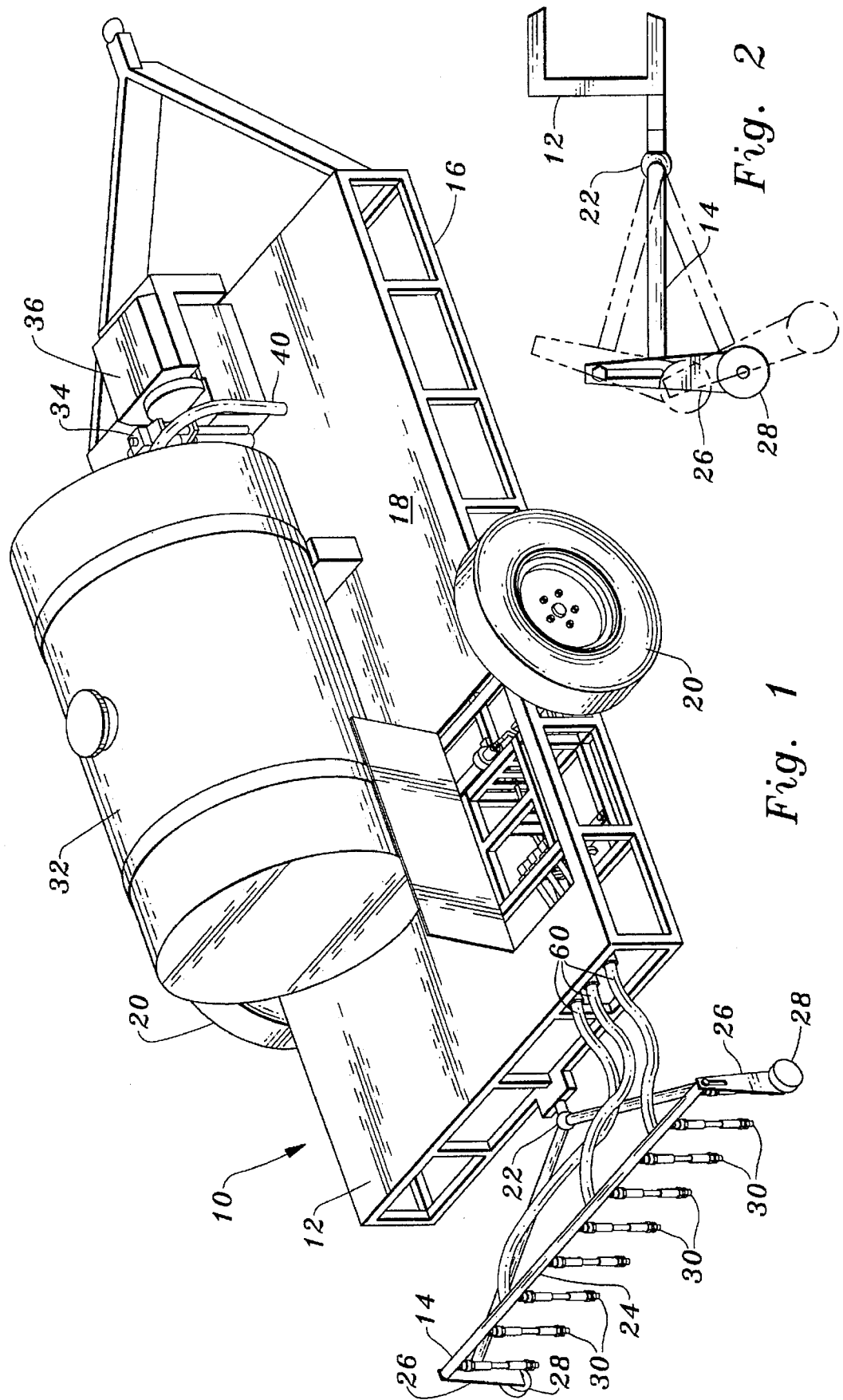

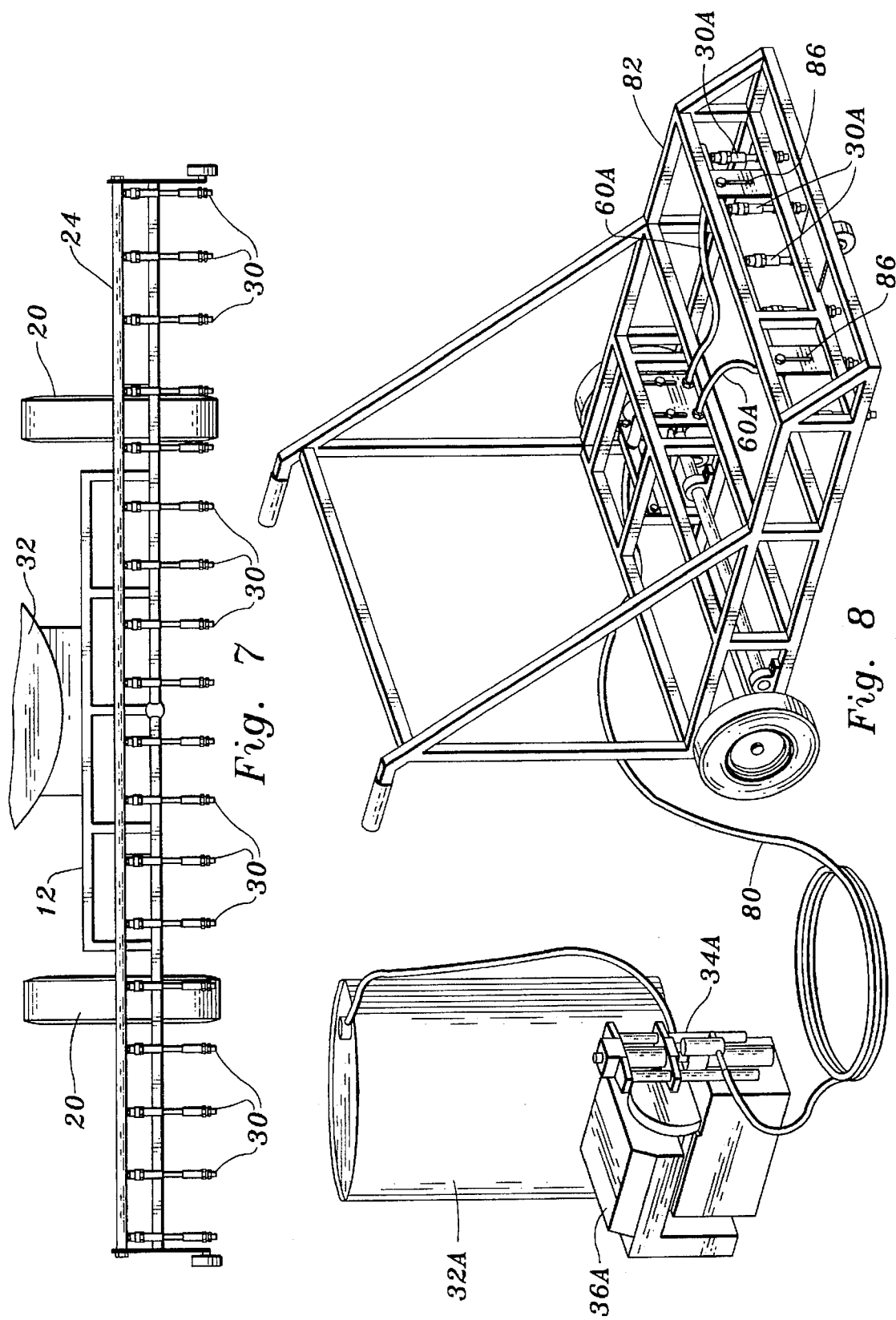

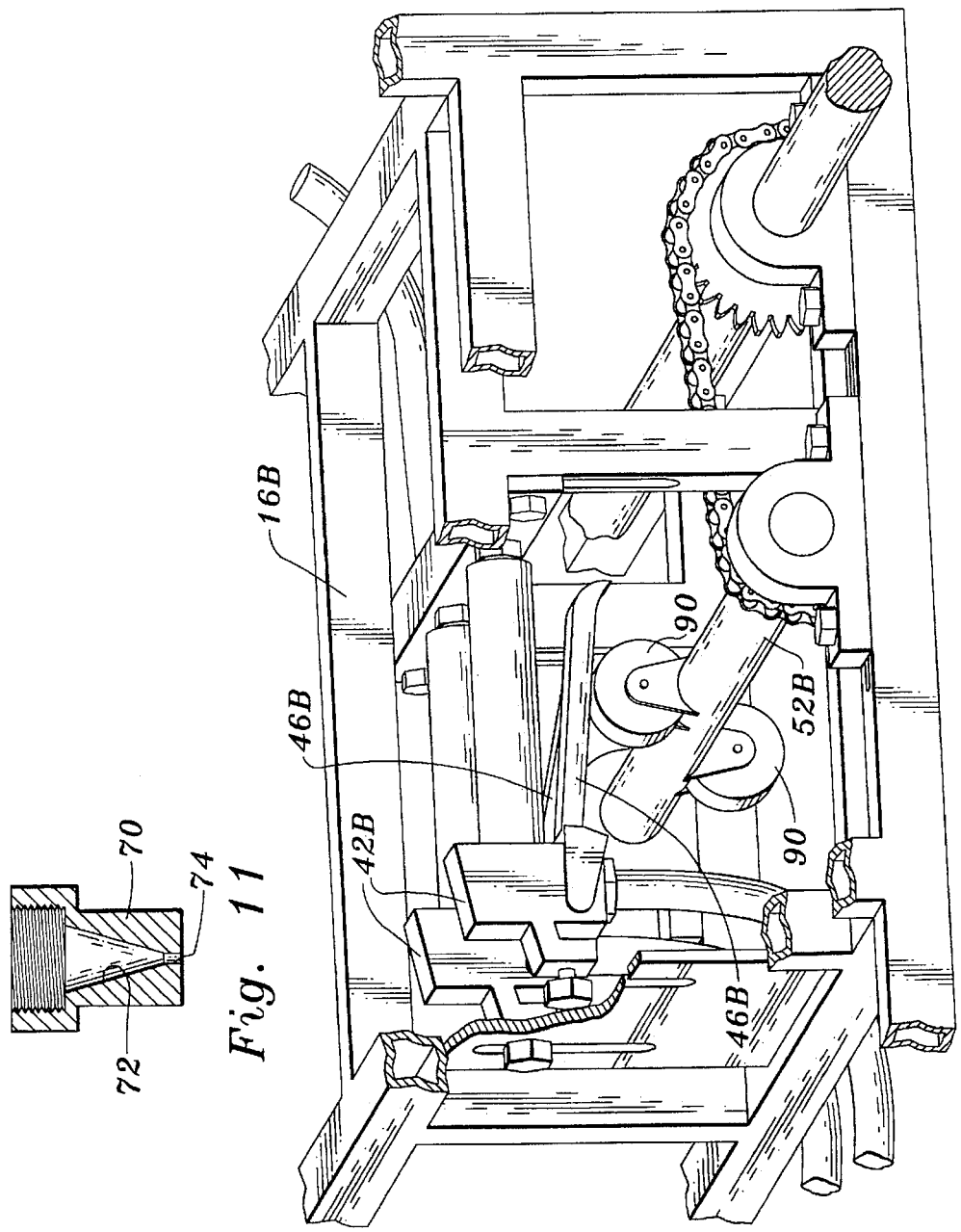
Fig. 10
Fig. 11
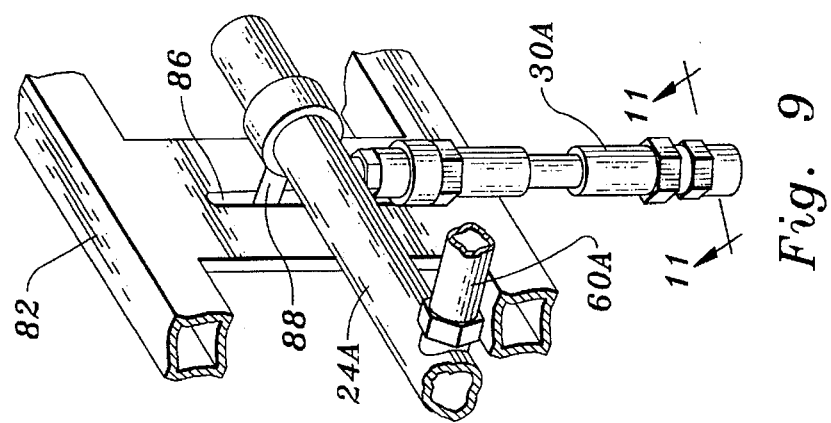
Fig. 9

APPARATUS AND METHOD FOR INJECTING PREHYDRATED HYDROPHILIC POLYMER MATERIAL INTO THE GROUND

TECHNICAL FIELD

This invention relates to apparatus for injecting prehydrated hydrophilic polymer material into the ground. Such material, after penetrating the soil, is utilized to retain moisture subsequently applied to the ground, swelling and holding the water for an extended length of time. The invention also encompasses a method.

BACKGROUND ART

U.S. Pat. No. 5,394,812, issued Mar. 7, 1995, discloses one prior art approach for injecting a small quantum of gel-like substances of hydrophilic material into the ground as discrete cylindrical hydrophilic slugs deployed in a uniform pattern. Upon penetration in the soil, and especially when the slugs of material reach a soil change or gradient, the hydrophilic material stops its advancement into the soil substrate and either fans out or remains in its initial configuration.

Other known techniques for dispensing hydrophilic polymer material involve mixing the polymer with water in an injection pump which directly receives the polymer. Water is then pumped therein under high pressure. This approach stresses the equipment since the polymer may clump up when mixed, particularly when the dispensing is to be throttled on and off. Yet another prior art approach involves administering the polymer in a liquid solution as a uniform continuous steam into the ground. High pressures are involved in such distribution systems and the equipment employed is prone to failure because it cannot simultaneously and continuously achieve the force required to accurately penetrate the soil.

It is also known to treat sod, such as that employed on golf courses, with polymer by slicing into the sod with a disc-like implement or injecting a liquid ribbon. Use of a disc requires subsequent replacement of the soil over the polymer and such an approach imposes a limitation on the distance between rows of polymer. Linear ribbon application, on the other hand, causes sod to swell in a non-uniform manner, possibly providing undesirable undulations on the surface.

Referring once again to the arrangement disclosed in U.S. Pat. No. 5,394,812, such patent provides an arrangement for mixing polymer in water and then injecting the mixture through the soil. A storage tank supported on a trailer receives a combination of polymer and water. A pump receives the mixture and delivers it through a high pressure hose to an outlet distribution device including a plurality of nozzles supported from a wheeled carriage frame.

The mixture is injected into the soil by periodic pulsing of a solenoid type valve so that upon opening of the valve, the mixture is injected under high pressure into the soil. When the valve is closed, a pressure bleed-off returns the mixture to the tank for agitating the mixture in the tank. Such an arrangement involving recirculation of the mixture not only adds to the complexity of the apparatus but can damage, such as by shredding, the polymer material, rendering it less effective when applied to the soil. Furthermore, such an arrangement necessarily requires a relatively high water to polymer ratio in the mixture resulting in inefficient delivery of the polymer to the soil.

The following additional patents are also believed to be representative of the present state of the prior art in this field:

U.S. Pat. No. 5,370,069, issued Dec. 6, 1994, U.S. Pat. No. 5,303,663, issued Apr. 19, 1994, U.S. Pat. No. 5,101,745, issued Apr. 7, 1992, U.S. Pat. No. 5,291,842, issued Mar. 8, 1994, U.S. Pat. No. 4,009,666, issued Mar. 1, 1977, U.S. Pat. No. 3,875,876, issued Apr. 8, 1975, U.S. Pat. No. 4,903,618, issued Feb. 27, 1990, U.S. Pat. No. 4,034,686, issued Jul. 12, 1977, U.S. Pat. No. 3,331,340, issued Jul. 18, 1967, U.S. Pat. No. 3,330,070, issued Jul. 11, 1967, U.S. Pat. No. 2,930,334, issued Mar. 29, 1960, U.S. Pat. No. 4,807,544, issued Feb. 28, 1989, U.S. Pat. No. 4,903,618, issued Feb. 27, 1990, and U.S. Pat. No. 4,907,516, issued Mar. 13, 1990.

DISCLOSURE OF INVENTION

The apparatus of the present invention is characterized by its relative simplicity, dependability and low cost and operating expenses as compared to prior art approaches for injecting polymer material into the ground.

According to the teachings of the invention, the polymer material is premixed with water so that it is in hydrated form, either wholly or partially. Thus, the prehydrated hydrophilic polymer material may be stored in standard drums or other containers and retrieved directly from the containers and immediately injected into the ground without additional agitation or mixing which can damage the polymer material. It is very important that this be accomplished since shredding or other damage to hydrophilic polymers can severely diminish their efficacy insofar as retention of water is concerned.

The apparatus of the present invention utilized to inject prehydrated hydrophilic polymer material into the ground includes portable support means movable along the ground. Container means defines a container interior for holding a quantity of prehydrated hydrophilic polymer material.

Pump means is mounted on the portable support means in fluid-flow communication with the container interior for pumping prehydrated hydrophilic polymer material from the container interior and pressurizing the prehydrated hydrophilic polymer material.

Prime mover means is mounted on the portable support means and is connected to the pump means for operating the pump means.

A plurality of airless fluid ejector guns are mounted on the portable support means. The airless fluid ejector guns are spaced from one another and each airless fluid ejector gun leads to at least one of a plurality of outlet nozzles supported by the support means above the ground and oriented toward the ground.

The airless fluid ejector guns include gun valve means for selectively establishing fluid-flow communication between the outlet nozzles and the pump means to dispense discrete quantities of pressurized prehydrated hydrophilic polymer material from the airless fluid ejector guns through the outlet nozzles under high pressure toward and into the ground at spaced ground locations.

Control means is operatively associated with the gun valve means for separately establishing and terminating flow of pressurized prehydrated hydrophilic polymer material through each of the outlet nozzles.

The control means is cooperable with the airless fluid ejector guns to establish a flow of pressurized prehydrated hydrophilic polymer material to some of the outlet nozzles and to substantially simultaneously terminate flow of pressurized prehydrated hydrophilic polymer material through other of the outlet nozzles. The pump means comprises a fluid-driven piston pump.

Other features, advantages, and objects of the present invention will become apparent with reference to the following description and accompanying drawings.

BRIEF DESCRIPTION OF DRAWINGS

FIG. 1 is perspective view of apparatus constructed in accordance with the teachings of the present invention and including a portable support means in the form of a wheeled trailer;

FIG. 2 is a side view of a secondary wheeled conveyance portion of the apparatus utilized to support a plurality of outlet nozzles, illustrating the outlet nozzles and associated structure in alternate positions;

FIG. 7 is a view similar to FIG. 3 but illustrating an alternate arrangement wherein a larger number of outlet nozzles are deployed;

FIG. 8 is a perspective view of an alternate form of apparatus which utilizes a manually transportable conveyance to support the outlet nozzles;

FIG. 9 illustrates an outlet nozzle and associated structure providing for adjustment of the positioning of the outlet nozzle relative to such support structure;

FIG. 10 is a perspective view of an alternative mechanism utilized to control flow of pressurized prehydrated hydrophilic polymer material to the outlet nozzles;

FIG. 11 is an enlarged, cross-sectional view taken along the line 11—11 of FIG. 9;

MODES FOR CARRYING OUT THE INVENTION

Figure 3:
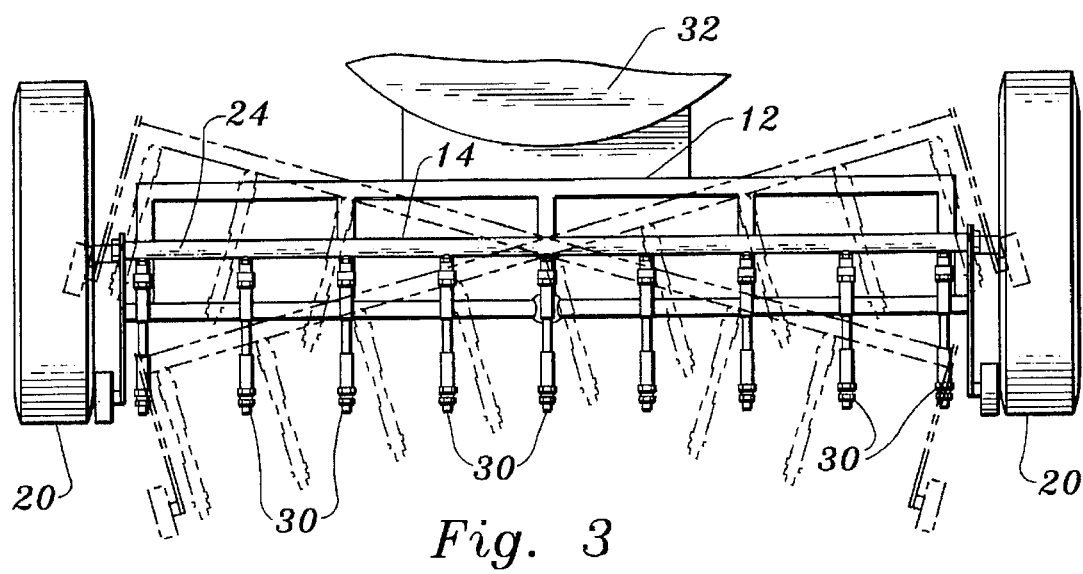
FIG. 3 is a rear view of the trailer portion of the apparatus illustrating the structure supporting the outlet nozzles in alternate positions.

Referring now to FIGS. 1–6, a preferred form of apparatus constructed in accordance with the teachings of the present invention includes a conveyance in the form of a trailer 10 including a primary trailer segment 12 and a secondary segment 14. Segment 12 includes a framework 16 and an upper platform 18 supported by wheels 20.

Secondary trailer segment 14 is connected to the primary trailer segment by a universal joint or coupling 22 which enables the secondary trailer segment to move up and down as shown in FIG. 2 or angularly as shown in FIG. 3 to allow conformance to the ground surface (not shown).

Secondary trailer segment 14 includes a cross member 24 selectively adjustably connected to end pieces 26 which depend downwardly therefrom and have support wheels 28 at the bottom ends thereof for engaging the ground. A plurality of outlet nozzles 30 depend from cross member 24. As will be seen below, the outlet nozzles 30 are for the purpose of directing flow of pressurized prehydrated hydrophilic polymer material toward and into the ground.

Positioned on platform 18 is a container in the form of a tank or drum 32 defining an interior for holding a quantity of prehydrated hydrophilic polymer material. The hydrophilic polymer material may be wholly or partially hydrated in advance and placed in the drum or container or such material can be mixed in the container to attain such condition. The container contents can have a gel-like consistency since the invention disclosed herein allows a relatively high polymer to water ratio in the mix.

Also mounted on platform 18 is a pump 34 driven by a gasoline engine 36. Pump 34 communicates with the interior of the tank 32 and pumps prehydrated hydrophilic polymer material therefrom.

It is important to the operation of the present invention that the pump be of a specific nature. More particularly, the pump is a fluid-driven piston pump. The pump/engine combination preferably has the capacity to deliver pumped material at a pressure of at least 4,000 psi. One pump/engine combination that satisfies this requirement is the Hydra M 4,000 Unit made available by Speeflo Manufacturing Corporation of Houston, Tex., incorporating a gasoline engine and a hydraulic driven piston pump.

Pump 34 delivers the highly pressurized prehydrated hydrophilic polymer material through an outlet conduit 40 (FIGS. 1 and 6) to the inlets of a plurality of airless fluid ejector guns 42 mounted on framework 16. In the arrangement illustrated, the conduit 40 leads to a manifold 44 on the framework to which the inlets of the guns 42 are connected and in fluid-flow communication. The outlets of the airless fluid ejector guns 42 are in communication with the outlet nozzles 30 in a manner which will be described in greater detail below.

A suitable airless gun which may be utilized when practicing this invention is the Speeflo H-Gun made available by Speeflo Manufacturing Corporation of Houston, Tex. Each gun includes an actuator handle 46 which mechanically actuates internal valve means (not shown) in a conventional manner to control dispensing from the gun.

Attached to each actuator handle 46 is a control element in the form of a flexible cable 48. When tension is applied to a cable 48 it will pull its associated handle 46 and open the valve means of that gun, it being understood that the handles are conventionally biased to a valve closing position to prevent flow of material therethrough until the handle is actuated by its respective cable.

Figure 6:
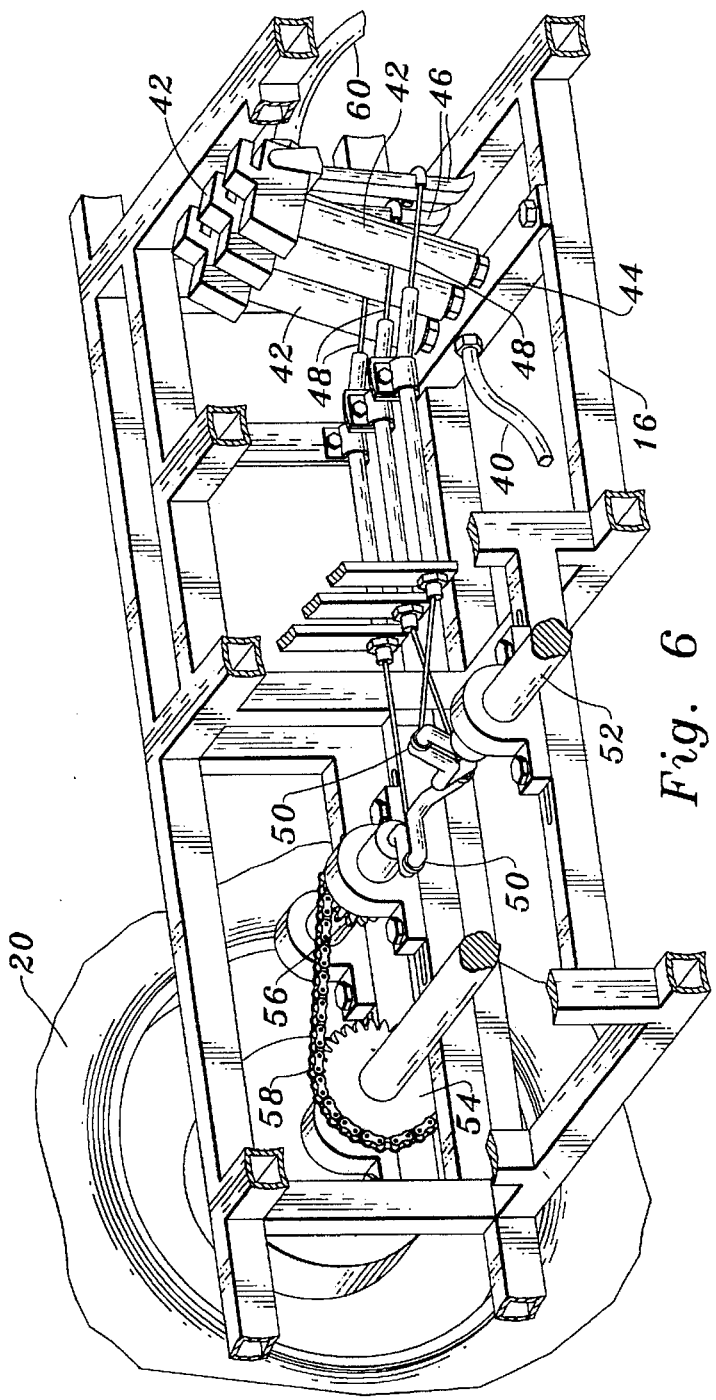
FIG. 6 is a partial, detailed, perspective view illustrating the apparatus control means in association with airless fluid ejector guns and related structure including mounting framework.

The cables 48 pass through the framework 16 as is perhaps is best illustrated in FIG. 6. The ends of the cables remote from the guns are attached to the crank element 50 of a shaft 52 rotatably mounted on the framework. The shaft and crank elements comprise a rotatable control member which is operable through the cables 48 to alternately open and close the airless gun valves responsive to rotation of the shaft.

The crank elements 50 are spaced from one another and some of the crank elements are offset with respect to other of the crank elements about the periphery of the shaft. With this arrangement, flow of pressurized prehydrated hydrophilic polymer material will be established through some of the outlet nozzles while flow of pressurized prehydrated hydrophilic polymer material will be simultaneously terminated through other of the outlet nozzles. This is important since it allows a uniform pressure to be maintained in the system and it makes most effective use of the fluid-driven piston pump without causing undue pressure variations which could damage the pump and other system components. Furthermore, such an arrangement provides for a more effective distribution of prehydrated hydrophilic polymer material into the ground which is traversed by the apparatus, i.e. the distribution is staggered and does not result in linear disruption of the soil when the hydrophilic polymer plugs distributed by the system absorb water.

In the arrangement of FIG. 6, rotation of the shaft 52 is effected by a chain drive arrangement rotating the shaft 52 in response to rotation of wheels 20. This drive includes a gear 54 affixed to the wheel shaft, a gear 56 attached to shaft 52 and a drive chain 58 interconnecting the gears.

Figure 4:
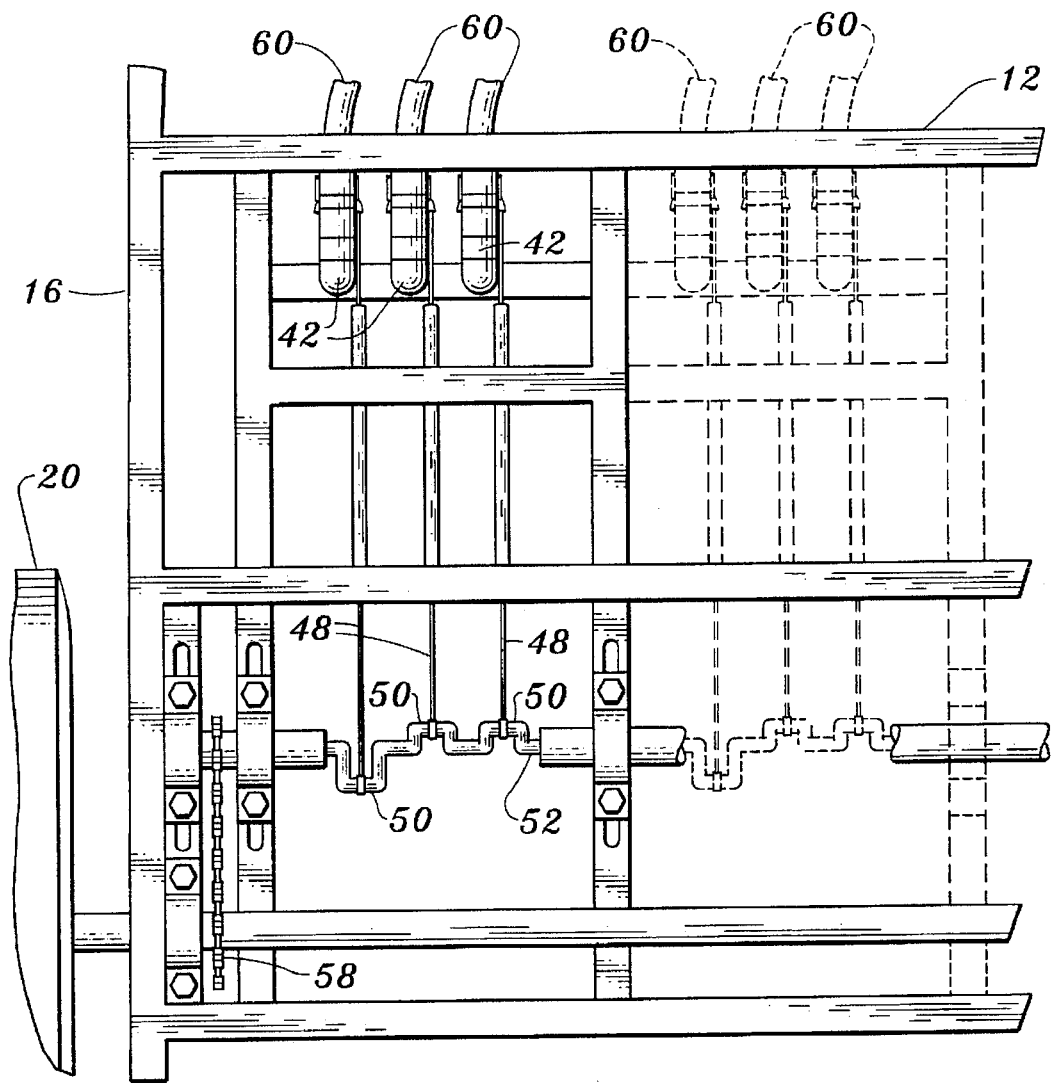
FIG. 4 is a partial top view of airless fluid ejector guns employed in the invention and a form of control means mounted on the trailer of the apparatus utilized to separately establish and terminate flow of pressurized prehydrated hydrophilic polymer material through the outlet nozzles.

Located at the outlets of the airless guns are hoses 60, each of which delivers pressurized prehydrated hydrophilic polymer material from the airless gun to one or more of the outlet nozzles 30. The number and position of outlet nozzles 30 serviced by each hose 60 is a matter of choice depending on the desired placement of the dispensed slugs of prehydrated hydrophilic polymer material. The number of airless guns 42 is also a matter of choice depending upon the circumstances. FIG. 4 depicts in solid line the disposition of three airless guns on the framework 16 and there is a dash line depiction of three additional guns (along with related structure) which may be employed.

Figure 5:
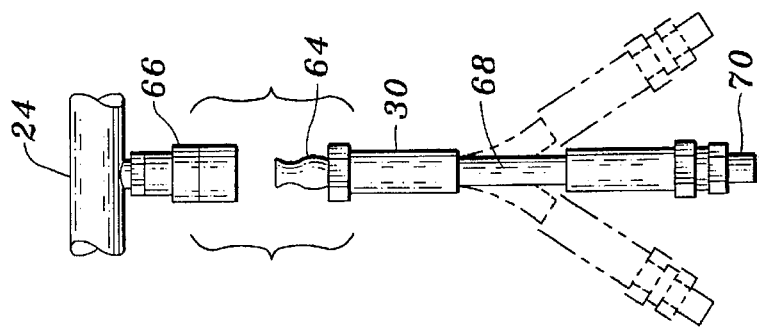
FIG. 5 is an enlarged partial view of a fluid ejector nozzle and related structure prior to connection of the nozzle to the remainder of the apparatus and illustrating the deflection capabilities of the nozzle.

FIG. 5 illustrates an outlet nozzle 30 employing a quick disconnect male member 64 of conventional construction at the upper end thereof which cooperates with a female quick disconnect socket 66 depending from cross-member 24, it being understood that the interior of the quick disconnect socket 66 communicates with the interior of a cross member 24. The cross member 24 may itself house the pressurized prehydrated hydrophilic polymer material delivered to the outlet nozzle or may house auxiliary or supplemental conduits (not shown) providing communication between the outlet nozzle 30 and a hose 60. If the cross member 24 directly accommodates the polymer material it may be divided into separate chambers by divider walls (not shown) to control flow to desired outlet nozzles. Alternatively, supplemental feed tubes (not shown) could lead from each hose to the individual outlet nozzles serviced thereby.

Outlet nozzle 30 includes a flexible length of tubing which will allow the distal end of the outlet nozzle to flex as illustrated in FIG. 5 in the event an obstruction is encountered. The lower or distal end of the outlet nozzle preferably is a removable nozzle 70 having the configuration shown in FIG. 11. From the upper screw end thereof the interior of the nozzle has a truncated cone-like configuration designated by reference 72 which leads to a round outlet orifice 74 having an inner diameter falling within the range of from about 0.01 in. to about 0.25 in.

It has been found that an orifice opening of this size is highly effective for delivering a discrete quantity or plug of prehydrated hydrophilic polymer material pressurized to a high pressure in the order of 4,000 psi to the ground and for providing penetration into the ground. The nozzle 70 is preferably constructed of a hard, wear resistant material such as stainless steel.

The number of outlet nozzles may vary. FIG. 7, for example, shows an arrangement similar to that described above which incorporates a larger number of outlet nozzles.

FIG. 8 shows another embodiment of the invention wherein the tank 32A, the pump 34A and the engine 36A are stationary and connected to outlet nozzles 30A through a primary connector hose 80. Outlet nozzles 30A are located on a wheeled framework 82 which supports the airless guns driven by the conveyance wheels. Hoses 60A interconnect the airless guns to the outlet nozzles 30A in the manner described above with respect to the first described embodiment.

FIG. 9 provides a enlarged sectional detail view of one outlet nozzle 30A, the outlet nozzle depending from and interconnected to the cross member or manifold 24A. Vertical slots 86 are formed in the framework 82 through which extend mounting bolts 88 which can be selectively moved up and down within the slots and tightened to adjust the height of the outlet nozzles 30A.

FIG. 10 illustrates another form of airless gun control which includes a shaft 52B rotatably mounted on framework 16B. In this instance the actuator handles 46B of the airless guns 42B ride on cam rollers 90 extending along the length of shaft 52B, the cam rollers being spaced from one another and at least some of the cam rollers being offset with respect to other of the cam rollers about the periphery of a shaft. Engagement by the cam rollers 90 will cause the actuator handles 46B to move upwardly to open the valves of the airless guns.

Figure 12:
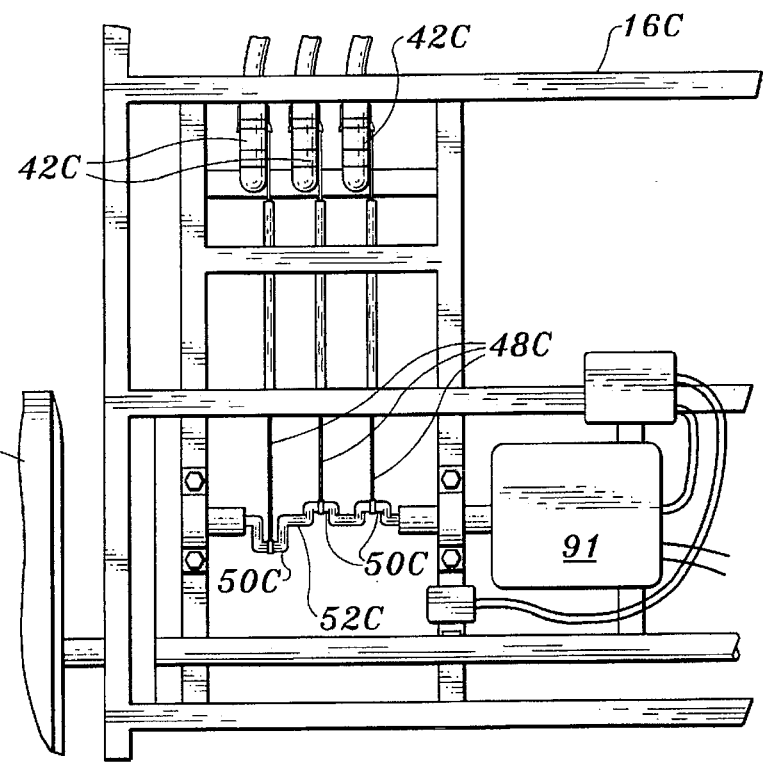
FIG. 12 is top, partial view of another alternative form of apparatus.

FIG. 12 illustrates another arrangement which may be utilized when practicing the teachings of the present invention. In this instance, a motor 91 is utilized to rotate shaft 52C.

Figure 13:
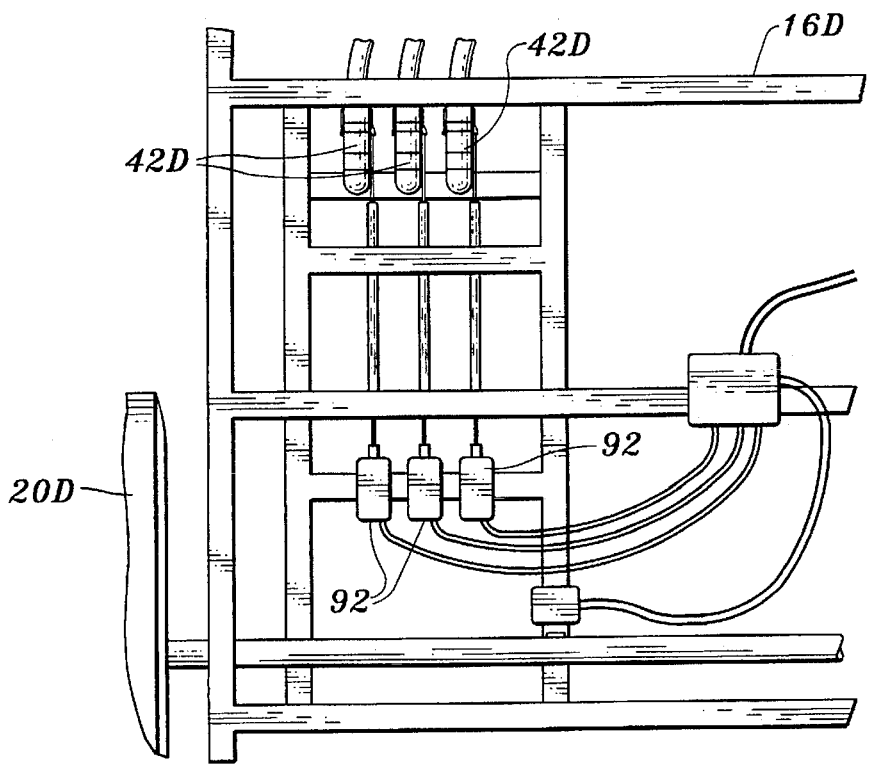
FIG. 13 is a view similar to FIG. 12 illustrating yet another alternative form of the apparatus.

In FIG. 13 solenoids 92 are utilized to open and close the valves of the airless guns 42D. The solenoids may be hydraulically driven or electrically operated.

Figure 14:
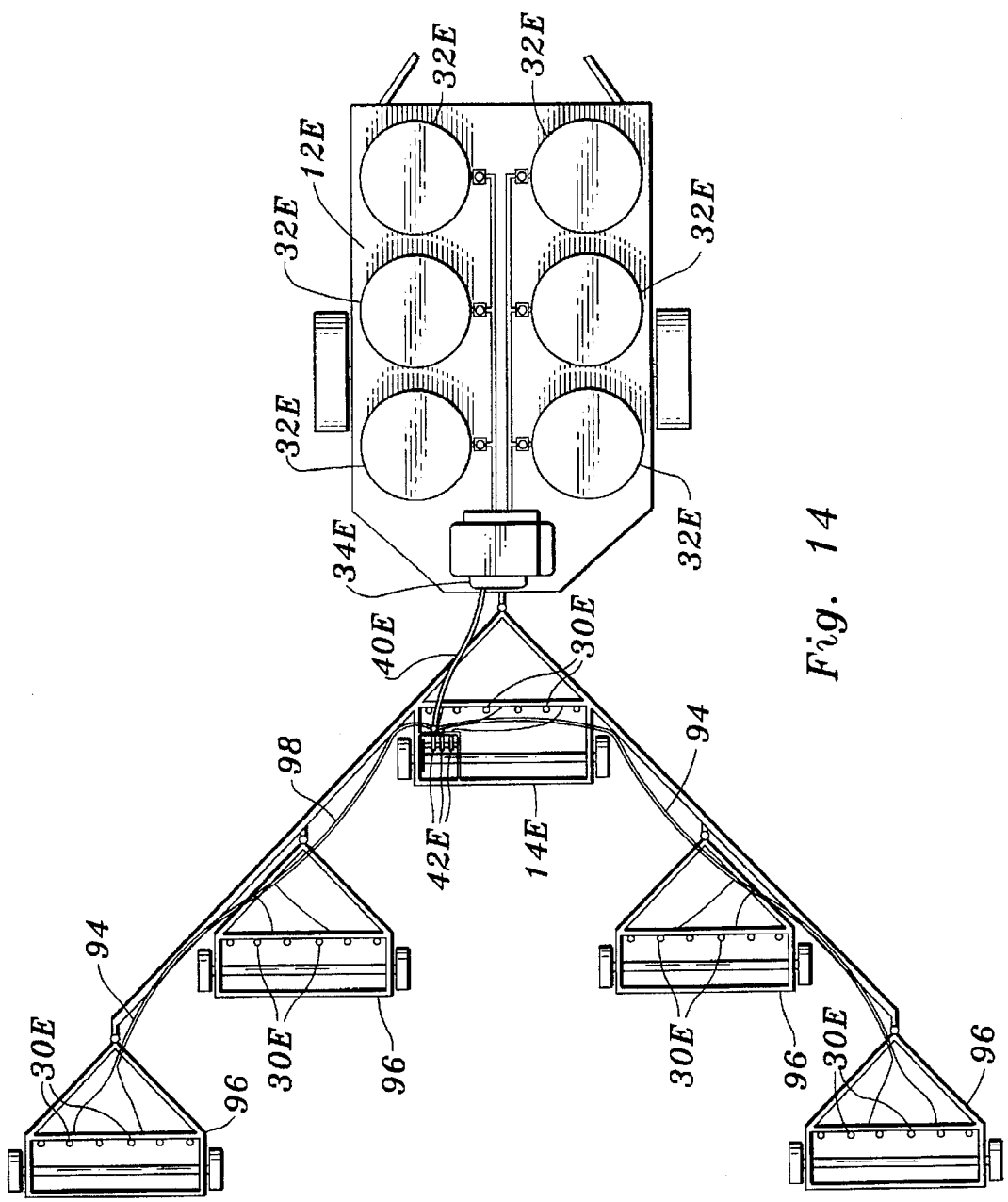
FIG. 14 is a schematic view of still another alternative form of the apparatus incorporating a plurality of secondary wheeled conveyances for supporting outlet nozzles.

FIG. 14 is a schematic illustration showing a primary trailer segment 12E having a plurality of tanks 32E thereon. In this arrangement a secondary trailer segment 14E is directly connected to the primary trailer segment.

A powered piston pump 34E is mounted on primary trailer segment 12E and delivers pressurized prehydrated hydrophilic polymer material through a conduit 40E to airless guns 42E on secondary trailer segment 14E. Distributor hoses 94 lead from the airless guns 42E to outlet nozzles 30E mounted on four additional trailing secondary trailer segments 96. The secondary trailer segments are all interconnected by a yoke 98 leading from the primary trailer segment. The secondary trailer segments are positioned so as to provide coverage substantially equivalent to the combined lengths of the secondary trailer segments, it being understood that the lead secondary trailer segment 14E also incorporates outlet nozzles 30E controlled by airless guns 42E.

Figure 15:
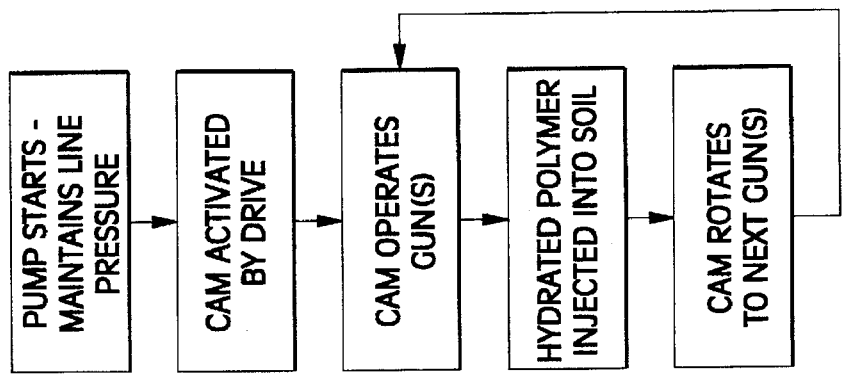
FIG. 15 is a block diagram illustrating sequential stages of operation of the apparatus.

FIG. 15 provides a diagrammatic illustration of the steps carried out when practicing the present invention.

A prime mover other than an internal combustion engine may be employed to drive the pump employed in the invention, an example being a compressed air driven motor.

Furthermore, the airless fluid ejector guns employed may be air operated. A suitable air operated gun is the Model 570X1 automatic extrusion gun made available by Binks Corporation.

I claim:

1. Apparatus for injecting prehydrated hydrophilic polymer material into the ground, said apparatus comprising, in combination:

portable support means movable along the ground;

container means defining a container interior for holding a quantity of prehydrated hydrophilic polymer material;

pump means mounted on said portable support means in fluid flow communication with said container interior for pumping prehydrated hydrophilic polymer material from said container interior and pressurizing said prehydrated hydrophilic polymer material;

prime mover means mounted on said portable support means connected to said pump means for operating said pump means;

a plurality of outlet nozzles supported by said portable support means above the ground and oriented toward the ground;

a plurality of airless fluid ejector guns mounted on said portable support means, said airless fluid ejector guns being spaced from one another and each airless fluid ejector gun leading to and in selective fluid-flow communication with at least one of said plurality of outlet nozzles supported by said support means above the ground and oriented toward the ground, said airless fluid ejector guns including gun valve means for selectively establishing fluid flow communication between the outlet nozzles and said pump means to dispense discrete quantities of pressurized prehydrated hydrophilic polymer material from said airless fluid ejector guns through said outlet nozzles under high pressure toward and into the ground at spaced ground locations; and control means operatively associated with said gun valve means for separately establishing and terminating flow of pressurized prehydrated hydrophilic polymer material through said outlet nozzles.

2. The apparatus according to claim 1 wherein said control means is mounted on said portable support means and responsive to movement of said portable support means along the ground to establish alternately establish and terminate flow of pressurized prehydrated hydrophilic polymer material through said outlet nozzles.

3. The apparatus according to claim 1 wherein said control means is cooperable with said airless fluid ejector guns to establish a flow of pressurized prehydrated hydrophilic polymer material through some of the outlet nozzles and to substantially simultaneously terminate flow of pressurized prehydrated hydrophilic polymer material through other of the outlet nozzles.

4. The apparatus according to claim 1 wherein said pump means comprises a fluid driven piston pump.

5. The apparatus according to claim 4 wherein said fluid driven piston pump is a hydraulic driven piston pump.

6. The apparatus according to claim 1 wherein said prime mover means is an internal combustion engine.

7. The apparatus according to claim 2 wherein said portable support means includes at least one wheel for facilitating movement of said support means along the ground and wherein said control means includes a rotatable control member rotatably mounted on said support means and control elements interconnecting said rotatable control member to said gun valve means to alternately open and close said gun valve means responsive to rotation of said rotatable control member.

8. The apparatus according to claim 7 wherein said rotatable control member comprises a shaft rotatably mounted on said portable support means at a location spaced from said plurality of airless fluid ejector guns and rotatable about an axis of rotation, said rotatable control member additionally comprising a plurality of crank elements extending along the length of said shaft, said crank elements being spaced from one another and at least some of said crank elements being offset with respect to other of said crank elements about the periphery of said shaft, and said control elements including elongated flexible connectors extending between said crank elements and said airless fluid ejector guns.

9. The apparatus according to claim 7 wherein said rotatable control member comprises a shaft rotatably mounted on said portable support means at a location spaced from said plurality of airless fluid ejector guns and rotatable about an axis of rotation, said rotatable control member additionally comprising a plurality of cam rollers extending along the length of said shaft, said cam rollers being spaced from one another and at least some of said cam rollers being offset with respect to other of said cam rollers about the periphery of said shaft, and said control elements including valve actuator arms of said airless fluid ejector guns engaged and movable by said cam rollers upon rotation of said shaft.

10. The apparatus according to claim 1 wherein said portable support means includes a primary wheeled conveyance and at least one secondary wheeled conveyance connected to and movable with and relative to said primary wheeled conveyance, said container means being mounted on said primary conveyance and said plurality of outlet nozzles being mounted on said at least one secondary conveyance, said plurality of outlet nozzles being connected to said container means through conduit means extending between said primary and secondary conveyances.

11. The apparatus according to claim 10 wherein said primary conveyance and said secondary conveyance are interconnected for articulatory relative movement.

12. The apparatus according to claim 1 wherein said outlet nozzles define round outlet orifices having an inner diameter falling within the range of from about 0.11 in. to about 0.25 in.

13. The apparatus according to claim 12 wherein said outlet nozzles include flexible nozzle elements.

14. The apparatus according to claim 10 wherein said portable support means includes a plurality of secondary wheeled conveyances connected to said primary wheeled conveyance behind said primary wheeled conveyance and movable therewith, said conduit means interconnecting said primary wheeled conveyance and said plurality of secondary wheeled conveyances.

15. The apparatus according to claim 7 wherein said rotatable control member is operatively associated with said at least one wheel and rotates in response to rotation of said at least one wheel.

16. The apparatus according to claim 1 wherein said control means includes a motor connected to said gun valve means.

17. The apparatus according to claim 1 wherein said control means includes a solenoid connected to said gun valve means.

18. A method of injecting hydrophilic polymer material into the ground comprising the steps of:

providing a quantity of prehydrated polymer material in a container interior;

pumping said prehydrated polymer material from said container interior;

pressurizing said pumped prehydrated polymer material;

directing said pressurized pumped prehydrated polymer material to a plurality of airless fluid ejector guns;

selectively and alternately actuating said airless fluid ejector guns to establish a flow of pressurized prehydrated hydrophilic polymer material through some of the outlet nozzles and to substantially simultaneously terminate flow of pressurized prehydrated hydrophilic polymer material through other of the outlet nozzles;

transporting said outlet nozzles over the ground; and directing discrete quantities of pressurized prehydrated hydrophilic polymer material through restricted openings in said outlet nozzles toward the ground and into the ground as said outlet nozzles are transported over the ground.

19. The method according to claim 18 wherein said pumping step is carried out by a fluid driven piston pump.

20. The method according to claim 18 wherein said restricted opening has a round cross section and a diameter within the range of from about 0.01 in. to about 0.25 in.

* * * * *